March 16, 1954
H. A. CLARK
2,672,104
BAKING PAN, COATING COMPOUNDS, AND
METHODS OF PREPARATION AND BAKING
Filed Sept. 2, 1949
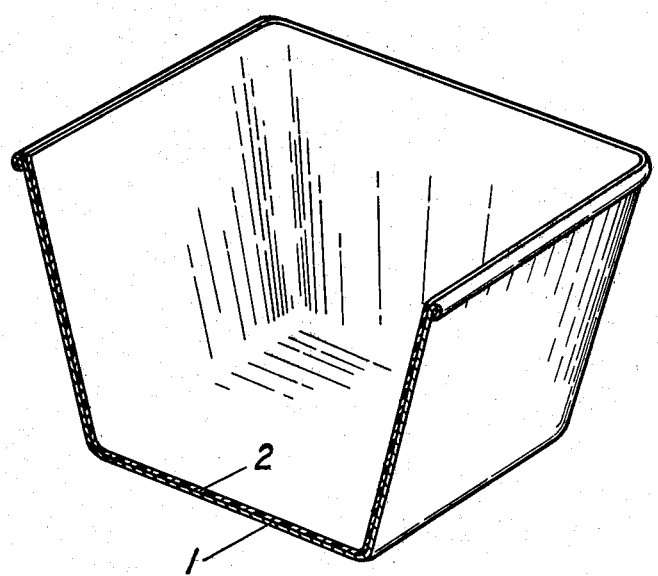
INVENTOR.
HAROLD A. CLARK
BY *Harry P. Pingman*
ATTORNEY Patented Mar. 16, 1954

2,672,104

UNITED STATES PATENT OFFICE 2,672,104

BAKING PAN, COATING COMPOUNDS, AND METHODS OF PREPARATION AND BAKING

Harold A. Clark, Midland, Mich., assignor to Dow Corning Corporation, Midland, Mich., a corporation of Michigan Application September 2, 1949, Serial No. 113,899

18 Claims. (Cl. 107—54)

The present invention relates to high molecular weight resins containing polysilane and polysiloxane type bondings and to their production.

Heretofore, in the organosilicon industry the resins which have become of major importance are organopolysiloxanes. These resins are of major importance due to their great thermostability as compared to the previous organic type resins.

In my copending application, Serial No. 99,338, filed June 15, 1949, now U. S. Patent No. 2,563,005, issued August 7, 1951, I have disclosed the production of polysilane resins. In these resins the molecules are interconnected by silicon to silicon bonding, the remaining valences being satisfied by phenyl and methyl radicals.

The resins in accord with the present invention are polymers containing polysilane and polysiloxane type bondings. In these resins some of the silicon atoms in the molecules thereof are interconnected by silicon to silicon bonding and some of the silicon atoms are interconnected by silicon to oxygen bonding, the remaining valences being satisfied by phenyl and methyl radicals and radicals selected from the group consisting of hydroxyl radicals and primary and secondary alkoxy radicals. These resins are high molecular weight polymers with an average composition of (I) 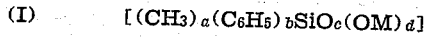

in which M is selected from the group consisting of hydrogen atoms, and primary and secondary alkyl radicals, $a+b$ has a value of from 1.4 to 2, $c$ has a positive value, $d$ has a value of from .01 to 1 and $a+b+2c+d$ has a value of up to 3.5. Between 30 and 75 per cent of the total phenyl and methyl radicals are phenyl radicals.

These polysilane-polysiloxane resins possess wholly unexpected properties. Organosiloxane resins in the upper portion of the range between 1 and 2 organic radicals per silicon atom are generally of a cheesy nature. The organosiloxane resins with desirable properties are in the lower portion of the range between 1 and 2 organic radicals per silicon atom. The unexpected thing about the resins of the present invention is that the properties of the resins are most desirable when the resin has a degree of substitution of from 1.4 to 2 total phenyl and methyl radicals per silicon atom. Below 1.4 the resins are brittle and have less desirable characteristics.

Another outstanding characteristic of these resins is the length of cure necessary. These resins require a very short time for cure in comparison with conventional polysiloxane resins. For example one of the present resins cures in 10 minutes at 250° C., whereas the comparable polysiloxane resin did not cure within 5 hours at 250° C. After curing, the resins are very flexible and tough, and are not frangible.

One method for the preparation of these resins involves the reaction of an organochlorosilane with an alkali metal in amount sufficient to cause condensation of at least 20 per cent of the chlorine present in the chlorosilane but in amount less than sufficient to cause complete condensation. This product with the general formula (II) 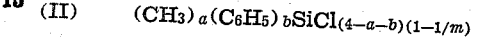

is then hydrolyzed by reaction with water and partially condensed to produce a composition of Formula I. The product of the reaction of the organochlorosilane with an alkali metal may have the residual chlorine atoms replaced by primary or secondary alkoxy radicals by reaction with an alcohol. The product which is of the general formula (III) 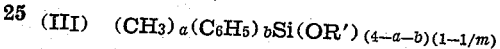

is then partially hydrolyzed by reaction with water and condensed by interaction of hydroxy radicals and elimination of water therefrom. There is thereby produced a composition of Formula I. In Formulae II and III, $a$ and $b$ have the values and are related as above indicated, R' represents a radical of the group consisting of primary and secondary alkyl radicals and $m$ has a value of more than 1 and less than 5. Thus, these intermediates have the general formula (IV) 

where X is selected from the group consisting of chlorine atoms and primary and secondary alkoxy radicals.

Organochlorodisilanes such as $(ClC_6H_5CH_3Si)_2$, either alone or in mixture, or in mixture with organochlorosilanes, such as phenylmethyldichlorosilane, may be used in such relative amounts so as to prepare a reactant of Formula II. Equivalent primary and secondary alkoxy silanes may be used in like manner to prepare a reactant of Formula III.

The organochlorosilanes used in this method have the general formula (V) 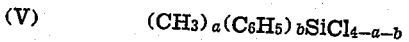

in which $a$ and $b$ have the values and are related as above indicated. Suitable organochlorosilanes which may be used in the method of the present invention are such materials as methyltrichlorosilane, phenyltrichlorosilane, phenylmethyldichlorosilane, diphenyldichlorosilane, dimethyldichlorosilane, triphenylchlorosilane, diphenylmethylchlorosilane, phenyldimethylchlorosilane and trimethylchlorosilane. Phenylmethyldichlorosilane alone or a mixture of these chlorosilanes may be employed. The chlorosilanes in the mixture are proportioned in such relative amounts as to provide mixtures of the defined character.

The alkali metals which may be used are sodium, potassium, caesium, rubidium or lithium. The sodium-potassium eutectic may be used if desired. However, in general it is desirable to employ either sodium or potassium due to their commercial availability.

It is desirable to have the alkali metal in a finely divided state to accelerate the rate of reaction. The alkali metal may be molten alkali metal dispersed in a liquid diluent such as an aliphatic or an aromatic hydrocarbon. Fine dispersion of the solid alkali metal in such a diluent may also be employed. Likewise the alkali metal may be employed in the form of wire or small cut pieces.

The reaction with the alkali metal is conducted with the organochlorosilane in liquid phase. The temperature at which the reaction is conducted is not critical. It may be conducted at room temperature or above. The reaction which is exothermic may be operated under reflux whereby the heat of reaction is dissipated by cooling of the reflux material or the heat may be dissipated by indirect heat exchange at below reflux temperature.

The reaction may be conducted either by adding the alkali metal to the organochlorosilane or the organochlorosilane to the alkali metal.

Following reaction with the alkali metal the reaction mixture may be filtered to remove residual metal and by-produced salt, and then hydrolyzed by mixing it with water. Alternatively the entire reaction mixture including alkali salt may be mixed with water without filtering. Using this method it is thus unnecessary to first filter to remove alkali metal salt as it is dissolved in the excess water.

If desired this chloride, prior to hydrolysis may be reacted by known procedure with a primary or secondary alcohol whereby to give a product of Formula III. This is then partially hydrolyzed by reaction with water whereby to replace a portion of the alkoxy radicals with hydroxy radicals. The hydroxy radicals are condensed with the elimination of water to give siloxane linkages. The product of this procedure is of the composition of Formula I.

A variation of the method of the present invention involves reacting an alkali metal with an organochlorosilane of the general formula (VI)          $R_nSiCl_{4-n}$ in which R is of the group consisting of phenyl and methyl and $n$ has a value of from 1 to 2 inclusive. The alkali metal is employed in amount sufficient to cause condensation of at least 20 per cent of the chlorine in the organochlorosilane but in amount less than sufficient to cause complete condensation. It is noted that one alkali metal atom is necessary per chlorine to cause complete condensation. An additional amount of the organochlorosilane is then mixed with the product of the above reaction so that the mixture has the average composition of Formula V. The chlorine in the mixture following addition of the chlorosilane is then hydrolyzed by reaction with water. The hydrolysis product is then condensed with the elimination of water to give a product of the composition of Formula I.

When it is desired to produce a compound of Formula I where M is selected from the group consisting of primary and secondary alkyl radicals, the partially condensed product of the reacting of the chlorosilane of Formula VI with an alkali metal is reacted with a primary or secondary alcohol. The resultant alkoxy silane may then be mixed with an alkoxy silane of the general formula, $R_nSi(OR')_{4-n}$ in which R is a radical selected from the group consisting of methyl and phenyl radicals, R' is a radical selected from the group consisting of primary and secondary alkyl radicals, and $n$ has a value of from 1 to 2, so as to produce a mixture which on the average corresponds to Formula III. This mixture is then partially hydrolyzed by reaction with water. The hydroxy radicals so formed then condense with the formation of water to yield a product of general Formula I.

The products of the present invention which have the composition of Formula I are resins. They may be cobodied with alkyd resins which may be oil modified if desired so as to interact residual hydroxyl groups of the alkyd resin with the OM groups of the present polysilane-polysiloxane resins. The resulting alkyd-silicone resin is thermosetting in character, makes an excellent paint or enamel when pigmented or a varnish without pigmentation, and is resistant to high temperatures.

The resins of the present invention of Formula I in which M represents hydrogen, may be used to coat bread pans internally. Following coating of the pans with the resin, the resin is dried to remove solvent. The pan so coated may be employed, either directly to bake bread in which case the resin is cured during use, or it may be heated to cure the resin and then used for baking. Bread may then be repeatedly baked in such pans without the necessity of using any grease. An embodiment of this aspect of the invention is shown in the accompanying drawing. The drawing is a sectional view of a breadpan 1 coated on the inner side with an organopolysilane-polysiloxane resin 2.

The pans to which the resin is applied should be clean in order to obtain the best results. In case the pans are new, the temporary coating should be burned off in accordance with customary bakery practice. If used pans are to be employed, they should be cleaned of all grease and flour. Conventional bakery cleaning practice is satisfactory for this purpose. It is desirable for the pans to be relatively free of fingerprints at the time of coating with the resin.

The pans are then coated with a solution of the organopolysilane-polysiloxane resin. Coating may be effected by spraying, brushing or dipping. Any excess resin is drained from the pans and the pans are then dried. The pans which carry a resin coating on their internal surfaces are then allowed to air dry. If desired the resin may be cured by heating to a temperature of from 400 to 500° F., though this is not necessary as the resin will cure during baking of the bread. The degree of cure may be increased by heating at a higher temperature or for a longer time or by the inclusion of a catalyst in the resin.

The pans so prepared which carry a film of cured resin are then ready for the baking operation. The loaf to be baked is placed in the pan without greasing the pan. After baking the loaf can be turned out of the pan which is then ready for another loaf. No banging on the pan is necessary to loosen the baked bread loaves.

The resins may be dissolved in any of the customary solvents such as benzene, toluene, xylene, naphtha and acrylic petroleum thinners.

These resins may be applied to surfaces to be coated either in solution in an organic solvent or they may be employed in a state free of solvent. When free of solvent, the resins of the present invention are thermoplastic and are highly viscous fluids at room temperature.

The resins of the present invention may be blended so as to modify their properties. The resins may be blended with each other, with organosiloxane resins, with polysilane resins, with silicone-alkyd resins, with natural resins, such as wood resin, copal, shellac, etc., with synthetic resins such as phenolaldehyde resins, urea-aldehyde resins, alkyd resins, cumar resins, vinyl resins, esters of acrylic and methacrylic acid etc., with cellulose esters as for example, cellulose nitrate, cellulose acetate and cellulose p-toluene-sulphonate, and with cellulose ethers, as for example, methyl cellulose, ethyl cellulose, propyl cellulose, butyl celluose, benzyl cellulose, allyl cellulose and hydroxy ethyl cellulose.

A solution of the resin may be used directly as a varnish, or the solution may have a pigment such as aluminum powder added to it. Paints or enamels containing the resins hereof may be cured by heating following coating.

Such resin mixtures, pigmented with a powdered aluminum and thinned with a volatile solvent, are desirable for such uses as coating ovens, smokestacks and exhaust manifolds.

Catalysts such as lead, zinc, cobalt and manganese salts may be employed to accelerate the rate of setting, or to lower the temperature required to bring about setting of the resins.

The resins of the present invention are of utility for electrical insulation and due to their toughness, durability and flexibility make excellent magnet wire enamels.

Example 1

192.5 parts by weight of $CH_3C_6H_5SiCl_2$ were mixed with 400 parts of dry toluene and this mixture refluxed. 34.5 parts of metallic sodium, in small pieces, were then added to the chlorosilane. The mixture was then refluxed for a period of 20 hours, the reaction product filtered and the precipitate checked for unreacted sodium. There was no evidence of any sodium present.

The partially condensed filtrate so produced was then gradually added with agitation to 200 parts of cold water. The resin was concentrated to 100 per cent solids resulting in a yield of 121 parts of resin. This resin will cure to a tough film after heating for 3 hours at 250° C.

Example 2

325 parts by weight of $C_6H_5CH_3SiCl_2$ and 63.4 parts of $C_6H_5SiCl_3$ were mixed with 500 parts of anhydrous toluene and the mixture brought to refluxing temperature. 39.6 parts of sodium were then added in small pieces. The addition time was 1½ hours. The mixture was then refluxed for a period of 17 hours. The reaction product was filtered hot and the precipitate checked for unreacted sodium. None was evident.

The partially condensed filtrate was gradually added with agitation to 368 parts of cold water. The resulting hydrolyzate was washed 10 times with water, then with a mixture of equimolar parts of ethanol and pyridine. The resultant resin solution was concentrated to 285 parts which contained 86.5 per cent resin solids. A film of this resin after heating for 3 hours at 250° C. had excellent flexibility.

Example 3

253.5 parts by weight of $C_6H_5SiCl_3$ and 103.2 parts of $(CH_3)_2SiCl_2$ were mixed and the mixture brought to reflux temperature. Sodium was added at the rate of 25 parts per hour until 59.7 parts had been added. The mixture was then stirred for 3 hours. After standing overnight, the mixture was diluted with 300 parts of toluene and brought to reflux temperature for ½ hour. The mixture was cooled with stirring under a blanket of nitrogen. The mixture was checked for unreacted sodium and none was indicated.

350 parts of cold water were then added to the mixture over a period of ½ hour. 100 parts of additional toluene were used for a wash. The organic layer was washed with hot water and residual traces of hydrolyzable chlorine were neutralized by adding calcium carbonate. 320 parts of resin solution containing 56.0 per cent solids were obtained. This resin air dried tack free.

Example 4

211.5 parts by weight of $C_6H_5SiCl_3$ were mixed with 129 parts of $(CH_3)_2SiCl_2$. This mixture was then added to 200 parts of xylene. 69 parts of sodium were added at the rate of 35 parts per hour. All the sodium had reacted at the end of the addition time. The mixture was then refluxed and stirred for 2 hours and filtered. No unreacted sodium was found in the precipitate.

The filtrate was added gradually to 300 parts of cold water with continued agitation. The organic layer was separated and washed several times with water. The residual chloride present was neutralized with calcium carbonate. The resin solution was concentrated to 202 parts of resin solution containing 52.1 per cent solids. This resin air dried tack free. After heating for 3 hours at 250° C., the resin was flexible.

Example 5

A mixture of 253.1 parts by weight of $(C_6H_5)_2SiCl_2$, 89.7 parts of $CH_3SiCl_3$, 211.5 parts of $C_6H_5SiCl_3$ and 268 parts of $C_6H_5CH_3SiCl_2$ were added to 500 parts of toluene. After the mixture had been brought to reflux, 55.2 parts of sodium were added in small pieces over a 2 hour period. The reaction mixture was next stirred at reflux for 17 hours. The reaction mixture was then cooled and checked for unreacted sodium. None was found.

Without filtration the reaction mixture was added to 1,000 parts of cracked ice and 500 parts of water with agitation. The organic layer was then separated and washed. The reaction mixture was then filtered and the filtrate mixed with calcium carbonate. 640 parts of resin solution were obtained containing 64.5 per cent solids. This resin had good flexibility after heating for 3 hours at 250° C.

Example 6

166.4 parts by weight of $(CH_3)_2SiCl_2$, 286.6 parts of C₆H₅CH₃SiCl₂ and 317.3 parts of C₆H₅SiCl₃, were mixed and diluted with 600 parts of toluene. The mixture was then brought to reflux temperature. 40 parts of sodium in small pieces were next gradually added over a 1 hour period. The reaction mixture was then refluxed for 2½ hours. 32.4 parts of sodium were then added in one-half hour. The mixture was refluxed and stirred for an additional six hours. All the sodium was then found to have reacted.

The mixture was cooled and added with agitation to 1,500 parts of cold water. After a number of washes, the residual acid was neutralized by adding portions of a mixture of equimolar parts of pyridine and ethanol. The resin solution was then filtered and concentrated to 100 per cent solids by heating at 230° C. at 75 mm. The solid resin was then diluted with toluene. 303 parts of resin solution containing 73.1 per cent solids was obtained. This resin cured in only 10 minutes at 250° C. to give an excellent tack free flexible film. This resin was coated on a panel and the panel bent over a one-eighth inch mandrel without cracking.

To compare a polysiloxane resin produced using the same amounts of chlorosilanes and produced according to a conventional method, the following resin was prepared: 166.4 parts by weight of (CH₃)₂SiCl₂, 286.6 parts of $$C_6H_5CH_3SiCl_2$$

and 317.3 parts of C₆H₅SiCl₃ were mixed and diluted with 891 parts of toluene. This mixture was then added to 1490 parts of cold water. After agitation the resin was washed acid free with hot water and concentrated to 100 per cent solids by heating at 250° C./100 mm. The resin was then dissolved in toluene yielding 560 parts of resin solution containing 74.4 per cent solids. This resin did not cure in 5 hours at 250° C.

The organopolysilane-polysiloxane resin and the organosiloxane resin were prepared using the same amounts of organochlorosilane reactants, namely, equimolar amounts of C₆H₅CH₃SiCl₂, C₆H₅SiCl₃ and (CH₃)₂SiCl₂. It was thus found that by utilizing the method of the present invention, the organopolysilane-polysiloxane resin so produced cured in 10 minutes at 250° C., while the comparable polysiloxane resin did not cure in 5 hours at 250° C.

*Example 7*

A mixture of 573 parts by weight of $$C_6H_5CH_3SiCl_2$$

158.6 parts of C₆H₅SiCl₃ and 96.6 parts of $$(CH_3)_2SiCl_2$$

was added to 600 parts of toluene. The mixture was then brought to reflux temperature. 74.7 parts of sodium were next added in small pieces over a period of two and three-quarters hours. The reaction mixture was then stirred for four hours at the end of which time the sodium was found to be completely reacted.

The whole reaction mixture was then added rapidly with agitation to 1500 parts of cold water. The organic layer was separated, washed and neutralized. The resin solution was concentrated to 100 per cent solids by heating at 215° C. at 75–100 mm. The resin was diluted with toluene and filtered. 551 parts of resin solution containing 87.1 per cent solids were obtained. This resin cures in less than one hour at 250° C. It has excellent flexibility and craze life.

*Example 8*

A mixture of 573 parts by weight of $$C_6H_5CH_3SiCl_2$$

and 211.5 parts of C₆H₅SiCl₃ was added to 600 parts of toluene. The mixture was then brought to reflux temperature. 69 parts of sodium were next added over a period of one hour and twenty minutes. The reaction mixture was then stirred for three hours, at the end of which time all the sodium had reacted.

The whole reaction mixture was then added rapidly with agitation to 1500 parts of cold water, and the organic layer separated, washed, and neutralized. The resin solution was concentrated to a 100 per cent solids by heating at 220° C. at 100 mm. The resin was next diluted with toluene and filtered. 534 parts of resin solution containing 85.1 per cent solids were obtained. This resin cured in one hour at 250° C.

*Example 9*

A mixture of 573 parts by weight of $$C_6H_5CH_3SiCl_2$$

and 211.5 parts of C₆H₅SiCl₃ was added to 600 parts of toluene. The mixture was then brought to reflux temperature. 69 parts of sodium were next added over a period of one hour and a half. The reaction mixture was then stirred for three hours, at the end of which time all the sodium had reacted.

The reaction mixture was next cooled and filtered. 60 parts of CH₃SiCl₃ were added to the filtrate. This mixture was then added to 1500 parts of cold water. The resin solution was washed, neutralized, and concentrated to 100 per cent solids by heating to 200° C. at 75 mm. The resin was diluted with a small amount of toluene and filtered. 526 parts of resin solution were obtained containing 82.8 per cent solids. This resin cured in 20 minutes at 250° C. producing a good tough flexible resin.

A solution of this resin was prepared containing 45 per cent resin solids in toluene and xylene. This resin solution was employed to insulate magnet wire by alternately dipping the wire in the solution and curing the film for four dips. The curing oven varied in temperature from 285° C. at the wire inlet to 535° C. at the outlet. The curing oven was five feet long. A curing time of about 50 seconds was obtained by moving the wire through the oven at a rate of 6 feet per minute.

*Example 10*

64 parts by weight of C₆H₅CH₃SiCl₂, 71 parts of C₆H₅SiCl₃ and 43 parts of (CH₃)₂SiCl₂ were mixed and added to 250 parts of toluene. The mixture was then brought to reflux temperature and 27 parts of sodium added over a period of 1 hour. The reaction mixture was then stirred for 2 additional hours at the end of which time all the sodium was found to have reacted.

The partially condensed polysilane product of the above reaction was mixed with 61 parts of ethyl alcohol. HCl was then separated from the product.

The alkoxy silane above produced was added to 23 parts of cold water catalyzed with 1 part of H₂SO₄ for hydrolysis. The resultant resin solution was concentrated to 100 per cent solids. A film of this resin was flexible after heating for 1 hour at 250° C.

Example 11

A mixture of 573 parts by weight of $$C_6H_5CH_3SiCl_2$$

and 211.5 parts of $C_6H_5SiCl_3$ was added to 600 parts of toluene. The mixture was then brought to reflux temperature and 69 parts of sodium added over a period of one hour and a half. The reaction mixture was then stirred for three hours at the end of which time all the sodium had reacted.

The partially condensed product of the above reaction was mixed with 360 parts of iso-propyl alcohol. HCl was then separated from the product.

To this partially condensed iso-propoxy silane, 88 parts of $CH_3Si(O-i-C_3H_7)_3$ were added. This mixture was then added to 152 parts of cold water containing 2 parts of sulphuric acid to hydrolyze the iso-propyl groups. The resultant resin solution was concentrated to 100 per cent solids. This resin cures in 1 hour at 250° C. producing a good tough flexible resin.

Example 12

382 parts by weight of $CH_3C_6H_5SiCl_2$ and 156 parts of $(CH_3Cl_2Si)_2$ were mixed with 645 parts of toluene and added with agitation to 945 parts of cold water. The organic layer was then separated and washed acid free. The resulting resin solution was concentrated and yielded 421 parts of resin solution containing 73.5 per cent resin solids. This resin cured in 1–3 hours at 200° C., and had not crazed after heating for 2,000 hours at 250° C. The dimethyltetrachlorodisilane, $(CH_3Cl_2Si)_2$, was prepared by reacting two mols of methyl Grignard with 1 mol of hexachlorodisilane in ether.

Example 13

401 parts by weight of methylphenylethoxychlorosilane, $C_6H_5CH_3SiOC_2H_5Cl$, were mixed with 650 parts of dry toluene. This mixture was than brought to reflux temperature. 46 parts of sodium were added in small pieces over a period of 1½ hours. This mixture was refluxed and stirred over night. It was then cooled and 20 parts of dry methanol were added to neutralize any remaining sodium.

The resulting dimethyldiphenyldiethoxydisilane, $(CH_3C_6H_5OC_2H_5Si)_2$, was hydrolyzed by adding 500 parts of 2 per cent aqueous sulfuric acid. The mixture was refluxed for 2 hours. The organic layer was then separated and washed with water. The product was concentrated to 100 per cent by heating to 275° C. at 5 mm. Upon distillation, 146 parts were obtained boiling in the range of from 230 to 260° C. at less than 1 mm. 98 parts of residue remained. Both the distillate and the residue were applied as a coating on sheet metal and cured for 3 hours at 250° C. Both films were tough and flexible.

That which is claimed is:

1. The method of preparing an organopolysilane-polysiloxane resin which comprises reacting an organochlorosilane of the general formula $(CH_3)_a(C_6H_5)_bSiCl_{4-a-b}$ in which $a+b$ has a value of from 1.4 to 2 inclusive and in which between 30 and 75 per cent of the total methyl and phenyl radicals are phenyl radicals, with an alkali metal in amount sufficient to cause condensation of at least 20 per cent of the chlorine in the organochlorosilane but in amount less than sufficient to cause complete condensation of the organochlorosilane, hydrolyzing by reaction with water of the resultant chloropolysilane which has the general formula 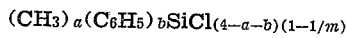 $(CH_3)_a(C_6H_5)_bSiCl_{(4-a-b)(1-1/m)}$ in which $m$ has a value of more than 1 and less than 5, and partially condensing hydroxyl radicals whereby there is produced an organopolysilane-polysiloxane resin with an average composition of $[(CH_3)_a(C_6H_5)_bSiO_c(OH)_d]$ in which $c$ has a positive value, $d$ has a value of from .01 to 1 and $a+b+2c+d$ has a value of up to 3.5.

2. The method of preparing an organopolysilane-polysiloxane resin which comprises reacting an organocholorosilane of the general formula $R_nSiCl_{4-n}$ in which R is selected from the group consisting of methyl and phenyl radicals and $n$ has a value of from 1 to 2 inclusive, with an alkali metal in amount sufficient to cause condensation of at least 20 per cent of the chlorine in the organochlorosilane but in amount less than sufficient to cause complete condensation, mixing with the product thereof an additional amount of an organochlorosilane of the aforesaid general formula, hydrolyzing by reaction with water of the resultant chlorosilane mixture which has the general formula $$(CH_3)_a(C_6H_5)_bSiCl_{(4-a-b)(1-1/m)}$$

in which $a+b$ has a value of from 1.4 to 2 inclusive, in which from 30 to 75 per cent of the methyl and phenyl radicals are phenyl radicals and in which $m$ has a value of more than 1 and less than 5, and partially condensing hydroxyl radicals whereby there is produced an organopolysilane-polysiloxane resin with an average composition of $[(CH_3)_a(C_6H_5)_bSiO_c(OH)_d]$ in which $c$ has a positive value, $d$ has a value of from .01 to 1 and $a+b+2c+d$ has a value of up to 3.5.

3. The method of preparing an organopolysilane-polysiloxane resin which comprises hydrolyzing by reaction with water of an organochloropolysilane which has the general formula $(CH_3)_a(C_6H_5)_bSiCl_{(4-a-b)(1-1/m)}$ in which $a+b$ has a value of from 1.4 to 2 inclusive and in which $m$ has a value of more than 1 and less than 5, and partially condensing hydroxyl radicals, whereby there is produced an organopolysilane-polysiloxane resin with an average composition of $[(CH_3)_a(C_6H_5)_bSiO_c(OH)_d]$ in which $c$ has a positive value, $d$ has a value of from .01 to 1, and $a+b+2c+d$ has a value of up to 3.5.

4. The method of preparing an organopolysilane-polysiloxane resin which comprises reacting an organochlorosilane of the general formula $(CH_3)_a(C_6H_5)_bSiCl_{4-a-b}$ in which $a+b$ has a value of from 1.4 to 2 inclusive and in which between 30 and 75 per cent of the total methyl and phenyl radicals are phenyl radicals, with an alkali metal in amount sufficient to cause condensation of at least 20 per cent of the chlorine in the organochlorosilane but in amount less than sufficient to cause complete condensation of the organochlorosilane, reacting the product thereof with an alcohol of the general formula R'OH where R' is selected from the group consisting of primary and secondary alkyl radicals, partially hydrolyzing the resultant silane which has the general formula

$$(CH_3)_a(C_6H_5)_bSi(OR')_{(4-a-b)(1-1/m)}$$

in which $m$ has a value of more than 1 and less than 5 by reacting with water, and condensing hydroxyl radicals, whereby there is produced an organopolysilane-polysiloxane resin with an average composition of $[(CH_3)_a(C_6H_5)_bSiO_c(OR')_d]$ in which $c$ has a positive value, $d$ has a value of from .01 to 1 and $a+b+2c+d$ has a value of up to 3.5.

5. The method of preparing an organopolysilane-polysiloxane resin which comprises reacting an organochloropolysilane which has the general formula $(CH_3)_a(C_6H_5)_bSiCl_{(4-a-b)(1-1/m)}$ in which $a+b$ has a value of from 1.4 to 2 inclusive and in which $m$ has a value of more than 1 and less than 5, with an alcohol of the general formula R'OH where R' is selected from the group consisting of primary and secondary alkyl radicals, partially hydrolyzing by reaction with water of the resultant silane which has the general formula 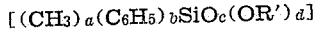, and condensing hydroxyl radicals, whereby there is produced an organopolysilane-polysiloxane resin with an average composition of $$[(CH_3)_a(C_6H_5)_bSiO_c(OR')_d]$$

in which $c$ has a positive value, $d$ has a value of from .01 to 1 and $a+b+2c+d$ has a value of up to 3.5.

6. The method of preparing an organopolysilane-polysiloxane resin which comprises reacting an organochlorosilane of the general formula $R_nSiCl_{4-n}$ in which R is selected from the group consisting of methyl and phenyl radicals and $n$ has a value of from 1 to 2 inclusive, with an alkali metal in amount sufficient to cause condensation of at least 20 per cent of chlorine in the organochlorosilane but in amount less than sufficient to cause complete condensation, reacting the product thereof with an alcohol of the general formula R'OH where R' is selected from the group consisting of primary and secondary alkyl radicals, mixing with the product thereof an alkoxy silane of the general formula $R_nSi(OR')_{4-n}$, where R, R', and $n$ are as above defined partially hydrolyzing by reacting with water the resultant silane mixture having the general formula $$(CH_3)_a(C_6H_5)_bSi(OR')_{(4-a-b)(1-1/m)}$$

in which $a+b$ has a value of from 1.4 to 2 inclusive, in which from 30 to 75 per cent of the methyl and phenyl radicals are phenyl radicals and in which $m$ has a value of more than 1 and less than 5, and condensing hydroxyl radicals whereby there is produced an organopolysilane-polysiloxane resin with an average composition of $[(CH_3)_a(C_6H_5)_bSiO_c(OR')_d]$ in which $c$ has a positive value, $d$ has a value of from .01 to 1, and $a+b+2c+d$ has a value of up to 3.5.

7. The method of preparing an organopolysilane-polysiloxane resin which comprises partially hydrolyzing by reaction with water of an alkoxypolysilane which has the general formula $(CH_3)_a(C_6H_5)_bSiOR'_{(4-a-b)(1-1/m)}$ in which $a+b$ has a value of 1.4 to 2 inclusive, in which $m$ has a value of more than 1 and less than 5, and in which R' represents a radical of the group consisting of primary and secondary alkyl radicals, and condensing hydroxyl radicals, whereby there is produced an organopolysilane-polysiloxane resin with an average composition of $$[(CH_3)_a(C_6H_5)_bSiO_c(OR')_d]$$

in which $c$ has a positive value, $d$ has a value of from .01 to 1, and $a+b+2c+d$ has a value of up to 3.5.

8. Organochloropolysilanes with the general formula $(CH_3)_a(C_6H_5)_bSiCl_{(4-a-b)(1-1/m)}$ in which $a+b$ has a value of from 1.4 to 2 inclusive and in which $m$ has a value of more than 1 and less than 5.

9. Alkoxypolysilanes with the general formula 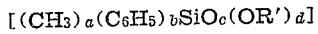 in which $a+b$ has a value of from 1.4 to 2 inclusive, $m$ has a value of more than 1 and less than 5 and R' is a radical selected from the group consisting of primary and secondary alkyl radicals.

10. Polysilanes with the general formula $(CH_3)_a(C_6H_5)_bSiX_{(4-a-b)(1-1/m)}$ in which X represents a substituent of the group consisting of chlorine atoms and primary and secondary alkoxy radicals, $a+b$ has a value of from 1.4 to 2 inclusive and $m$ has a value of more than 1 and less than 5.

11. Organopolysilane-polysiloxane resins with an average composition of $$[(CH_3)_a(C_6H_5)_bSiO_c(OH)_d]$$

in which $a+b$ has a value of 1.4 to 2 inclusive, $c$ has a positive value, $d$ has a value of from .01 to 1, $a+b+2c+d$ has a value of up to 3.5 and in which from 30 to 75 per cent of the total methyl and phenyl radicals are phenyl radicals.

12. Organopolysilane-polysiloxane resins with an average composition of $$[(CH_3)_a(C_6H_5)_bSiO_c(OR')_d]$$

in which $a+b$ has a value of 1.4 to 2 inclusive, $c$ has a positive value, $d$ has a value of from .01 to 1, $a+b+2c+d$ has a value of up to 3.5, in which from 30 to 75 per cent of the methyl and phenyl radicals are phenyl radicals and in which R' is a radical selected from the group consisting of primary and secondary alkyl radicals.

13. Organopolysilane-polysiloxane resins with an average composition of $$[(CH_3)_a(C_6H_5)_bSiO_c(OM)_d]$$

in which M is selected from the group consisting of hydrogen atoms, primary and secondary alkyl radicals, $a+b$ has a value of from 1.4 to 2 inclusive, $c$ has a positive value, $d$ has a value of from .01 to 1, $a+b+2c+d$ has a value of up to 3.5 and in which from 30 to 75 per cent of the total methyl and phenyl radicals are phenyl radicals.

14. The method of preparing a bread pan for the baking of bread which comprises coating the internal surfaces of the pan with an organopolysilane-polysiloxane resin with an average composition of $[(CH_3)_a(C_6H_5)_bSiO_c(OH)_d]$ in which $a+b$ has a value of 1.4 to 2 inclusive, $c$ has a positive value, $d$ has a value of from .01 to 1, $a+b+2c+d$ has a value of up to 3.5 and in which from 30 to 75 per cent of the total methyl and penyl radicals are phenyl radicals.

15. The method of baking bread which comprises baking the bread in contact with a supported film of an organopolysilane-polysiloxane resin with an average composition of $$[(CH_3)_a(C_6H_5)_bSiO_c(OH)_d]$$

in which $a+b$ has a value of 1.4 to 2 inclusive, $c$ has a positive value, $d$ has a value of from .01 to 1, $a+b+2c+d$ has a value of up to 3.5 and in which from 30 to 75 per cent of the total methyl and phenyl radicals are phenyl radicals, whereby release of the baked bread in the pan is obtained without the use of grease.

16. The method which comprises coating the internal surfaces of a bread pan with an organopolysilane-polysiloxane resin with an average composition of $[(CH_3)_a(C_6H_5)_bSiO_c(OH)_d]$ in which $a+b$ has a value of 1.4 to 2 inclusive, $c$ has a positive value, $d$ has a value of from .01 to 1, $a+b+2c+d$ has a value of up to 3.5, and in which from 30 to 75 per cent of the total methyl and phenyl radicals are phenyl radicals, curing the resin by heating and repeatedly baking bread in the pan so coated with the bread in contact with the resin during baking, whereby release of the bread in the pan is obtained without the use of grease.

17. The process of preparing disilanes which comprises reacting an alkali metal with an alkoxychlorosilane having the formula $CH_3C_6H_5SiOR'Cl$ in which $R'$ represents an alkyl radical, whereby there is produced a disilane of the formula $R'OCH_3C_6H_5SiSiC_6H_5CH_3OR'$.

18. A bread pan having a cooking surface consisting of a thin coating of a hardened organopolysilane-polysiloxane resin with an average composition of $[(CH_3)_a(C_6H_5)_bSiO_c(OH)_d]$ in which $a+b$ has a value of from 1.4 to 2 inclusive, $c$ has a positive value, $d$ has a value of from .01 to 1, $a+b+2c+d$ has a value of up to 3.5 and in which from 30 to 75 per cent of the total methyl and phenyl radicals are phenyl radicals.

HAROLD A. CLARK.

References Cited in the file of this patent

UNITED STATES PATENTS

| Number | Name | Date |
|---|---|---|
| Re. 16,431 | Kratzer | Sept. 21, 1926 |
| 1,328,556 | Bloch | Jan. 20, 1920 |
| 2,061,149 | Garrett | Nov. 17, 1936 |
| 2,165,154 | Freese | July 4, 1939 |
| 2,398,672 | Sauer | Apr. 16, 1946 |
| 2,450,594 | Hyde | Oct. 5, 1948 |
| 2,462,242 | Webb | Feb. 22, 1949 |
| 2,463,870 | Hansen | Mar. 8, 1949 |
| 2,469,888 | Patnode | May 10, 1949 |
| 2,470,593 | Webb | May 17, 1949 |
| 2,554,976 | Burkhard | May 29, 1951 |
| 2,563,005 | Clark | Aug. 7, 1951 |

OTHER REFERENCES

Kipping et al.: Journ. Chem. Soc. (London), vol. 19, pages 830 to 847 (1921).